United States Patent [19]

Ferguson

[11] 4,101,151
[45] Jul. 18, 1978

[54] CLAMP ASSEMBLY

[75] Inventor: Harry J. S. Ferguson, Winchester, Mass.

[73] Assignee: Clamp-All Corp., Needham, Mass.

[21] Appl. No.: 798,397

[22] Filed: May 19, 1977

[51] Int. Cl.² .................................. F16L 21/06
[52] U.S. Cl. .......................... 285/236; 285/322; 285/373
[58] Field of Search ............... 285/236, 369, 373, 322

[56] References Cited

U.S. PATENT DOCUMENTS

| | | | |
|---|---|---|---|
| 2,261,948 | 11/1941 | Beach | 285/236 X |
| 3,104,898 | 9/1963 | MacDonald et al. | 285/236 |
| 3,233,922 | 2/1966 | Evans | 285/236 |
| 3,341,232 | 9/1967 | Deakins | 285/373 |
| 3,479,066 | 11/1969 | Gittleman | 285/236 |
| 3,529,854 | 9/1970 | Thomas | 285/369 X |
| 3,801,141 | 4/1974 | Hollingsworth | 285/236 |

Primary Examiner—Thomas F. Callaghan
Attorney, Agent, or Firm—Richard P. Crowley

[57] ABSTRACT

A pipe-clamping device for coupling together in an end-to-end relationship identical pipe ends, which device comprises a clamping band to encircle the pipe ends, the band having a plurality of slots therein on each side extending generally axially to the coupled pipes, a raised edge means on each edge and a raised central section to define a longitudinally extending band-strap-retaining area; a sealing gasket disposed beneath the clamping band; and band straps disposed on the band-strap-retaining area on either side of the central raised section, the band straps adapted to compress the clamping band into a sealing relationship about the pipe ends.

8 Claims, 3 Drawing Figures

CLAMP ASSEMBLY

BACKGROUND OF THE INVENTION

The installation of rigid pipe, particularly a cast-iron pipe employed for sewage, sanitary and domestic plumbing requirements, typically requires the coupling or clamping together of the pipe ends in a fluid-tight, sealing, aligned relationship. Some such pipes have complimentary bell and spigot ends, and are joined together easily in the desired sealing relationship, without the absolute requirement for pipe-clamping or -coupling assemblies external to and about the coupling ends of the pipe. Other cast-iron or rigid plastic-type pipes require aligned end-to-end sealing where the ends of the pipe are each identical and are placed in an aligned abutting relationship. Such pipes require an external pipe-coupling or pipe-clamping assembly to secure the end-to-end pipes together in an aligned fluid-tight relationship. Bell- and spigot-type pipes may be assembled easily employing a peripheral-type gasket to insure a fluid-tight relationship, and, although not required, coupling or clamping means may be used also to retain the bell and spigot in the desired position.

Pipe-coupling and pipe-clamping assemblies for end-to-end pipe coupling have been proposed, such as, for example, as set forth in U.S. Pat. No. 3,104,898. This patent describes a tube or pipe-coupling means employing an encircling fixing band having a plurality of fingers extending circumferentially about a pipe joint having flared exterior end surfaces, and a ring-clip means to tighten the band about the abutting pipe joint.

Another pipe joint assembly is described in U.S. Pat. No. 3,233,922, wherein a corrugated-type clamping band is employed, together with an elastomeric inner seal, the corrugated band overlapping at its end and enclosing the elastomeric seal, and having external band-compressing straps. The corrugations on the external overlapping ends of the band make this pipe joint difficult to adjust where there is a variance in the external diameter tolerations of the end-to-end pipes to be joined. Other pipe-coupling means are shown in U.S. Pat. Nos. 3,565,468, 3,211,475 and 2,958,549 as representative of various coupling and clamping means employed in pipes, wherein a compressible band is employed around the pipe joint.

It is, therefore, desirable to provide a simple, easily manufactured and easily applied economical coupling- or clamping-means assembly to join pipes in a fluid-sealing relationship and an end-to-end relationship, particularly pipes which have identical ends. The clamping assembly should provide for the slight variations in the external pipe diameters, particularly with cast-iron pipes employed for domestic plumbing and sewage applications, and also should prevent movement and permit easy placement of encircling-compression straps used in the assembly.

SUMMARY OF THE INVENTION

My invention relates to an improved coupling or clamping assembly for joining together, in an end-to-end relationship, rigid pipes, particularly pipes having similar diameter and ends, in a fluid-sealing relationship, and to the pipes so joined by my clamping assembly.

My improved pipe-coupling and pipe-clamping assembly comprises in combination a flexible clamping band, typically a metal, flat, flexible, thin clamping band of defined length adapted to be wrapped about the outside diameter and across the pipe and abutting lines of two end-to-end pipes whose abutting ends are to be secured together, with the length sufficient to permit the clamping band to overlap at the ends thereof, and of sufficient width to be placed to extend on either side of the pipe-joint line. My assembly includes also a sealing-gasket means adapted to be disposed between the clamping band and the external diameter of the pipe, and strap means to tighten the clamping band about the external periphery of the pipe ends to be joined. The strap means comprises a plurality, such as a pair, of band straps adapted to be placed on either side of the pipe-end-joining line and about the external diameter of the clamping means, and means to tighten or compress the strap means and band and to place it into a sealing relationship with the underlying sealing gasket and the external peripheral underlying surface of the pipe.

In operation, the pipe, such as a cast-iron sewage pipe, is placed in an aligned end-to-end relationship with identical pipe ends, an elastomeric sealing gasket is placed about the abutting ends, the band clamp is placed over the sealing gasket, and, thereafter, the band straps are tightened to compress the band clamp and provide a sealing relationship.

My improved pipe-clamping assembly provides for the use and easy placement of band straps about and on the band clamp, and prevents the lateral or axial movement of band straps, particularly while and once they have been placed in a compressed/tightened position about the pipe ends. In addition, my pipe-clamping assembly provides means for the plane of the band clamp to be adjusted slightly to conform to the slight variation in external diameter of the pipes to be joined; thus, permitting a tight fluid-sealing relationship and flexibility with pipes of slightly different diameters and diameter tolerances, which often occurs in the manufacture of cast-iron pipes. Further my improved pipe-clamping assembly provides for the employment of an elastomeric gasket, and positions the gasket so that the gasket does not have a tendency to move, particularly while and once it is assembled and the band clamp is compressed. My pipe-clamping assembly is manufactured easily of flexible metal or plastic sheet material, either by stamping or molding, and is economical and simple in operation and use.

My invention will be described in particular in connection with the coupling together of a rigid, cast-iron pipe in an aligned end-to-end relationship, with each end of the pipe being identical. However, it is recognized and is within the spirit and scope of my invention that my pipe-clamping assembly may be employed to join together other pipes or tubes, and that modifications of my pipe-clamping assembly may be made by those persons skilled in the art, all within the spirit and scope of my invention.

DESCRIPTION OF THE EMBODIMENTS

Figure 1:
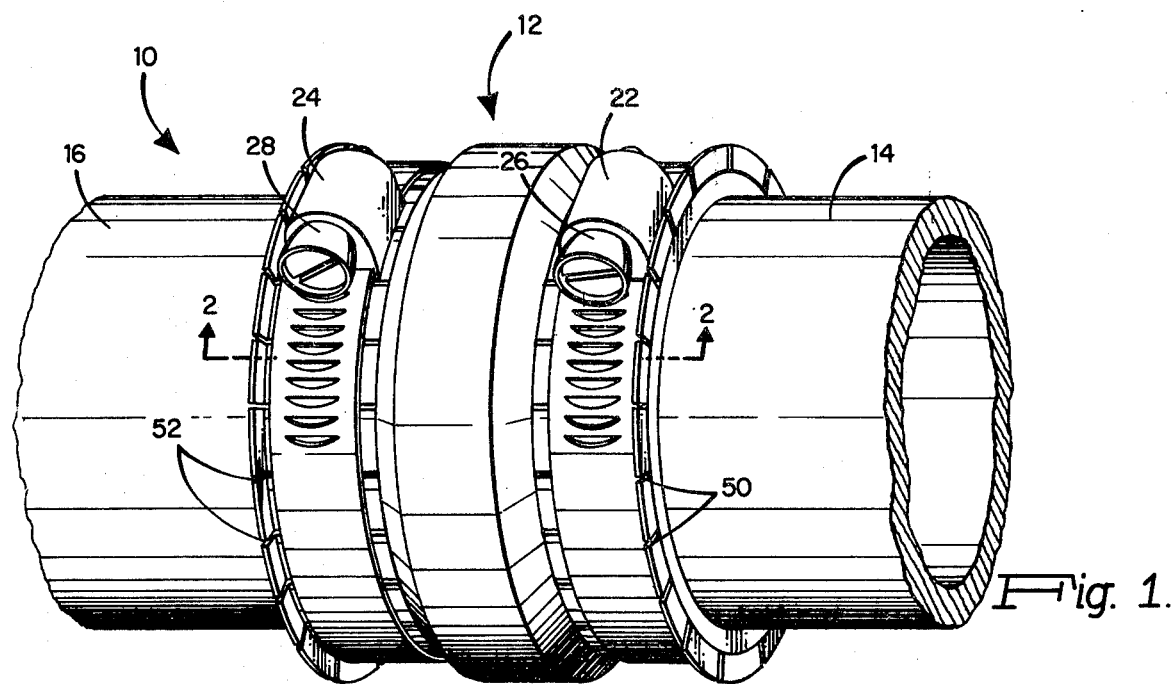
FIG. 1 shows a perspective view of a pair of pipes assembled together with my pipe-clamp assembly.
Figure 2:
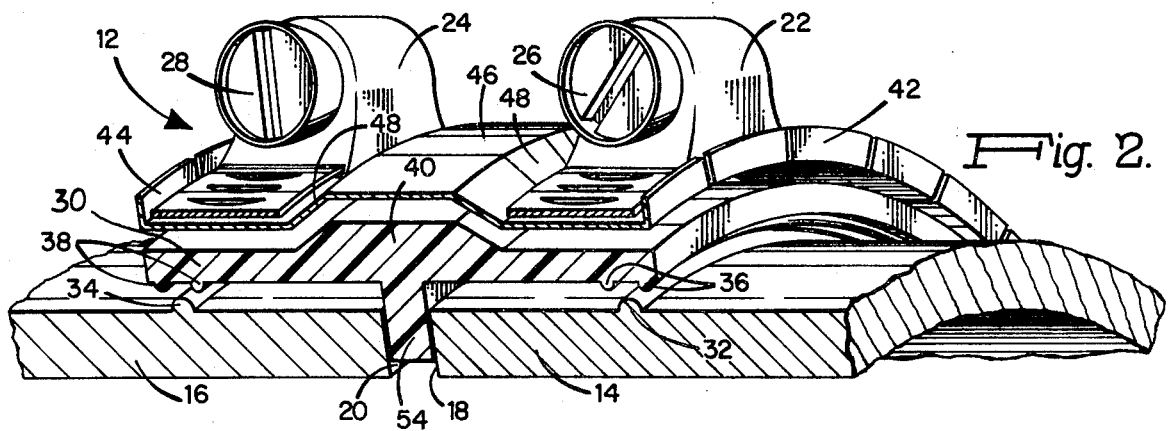
FIG. 2 shows an enlarged sectional perspective view along lines 2—2 of FIG. 1.

There is shown a coupled or joined pipe assembly 10 employing my clamping assembly 12, the pipes comprising a first pipe 14 and a second pipe 16, with a first pipe end 18 and a second pipe end 20, the pipe ends being identical and placed in an aligned end-to-end abutting relationship, the pipes having first and second peripheral pipe beads 32 and 34. The band clamp 12 is placed in a surrounding relationship, with the end of the band clamp overlapping slightly. The band clamp 12 has continuous, 90°, raised, outer edge beads 42 and 44 about either outer edge thereof, and is characterized by a flat, central, raised section 46, the raised section joined by 45° sides 48 extending from either side of the raised section 46 of the band clamp to a parallel, flat-strap-retaining area on either side defined by beads 42 and 48 and 44 and 48. The band clamp is characterized further by a plurality of slits 50 and 52 extending inwardly on either side in the thin metal material of the band clamp a short distance and generally axially to the aligned pipes 14 and 16. The slots 50 and 52 extend inwardly a desired length and angularly to permit conformance of the band 12 about the pipe diameter, and generally into the strap-retaining area. The band clamp may be spaced at intervals of ⅛ to 2 inches along the length of the band, and may extend inwardly about ⅛ to 2 inches.

Between the raised outer edge beads 42 and 44 and the sides 48 of the raised central section; that is, in the strap-retaining area, there are disposed band straps 22 and 24 with threaded tension bolts 26 and 28 at the end thereof, whereby the band straps may be tightened about the external periphery of the band clamp to compress the band clamp. The band-strap-retaining area is formed to be wider slightly than the width of the straps 22 and 24, the straps retained in the area and prevented from movement during compression.

Disposed underneath the band clamp is an elastomeric-sealing gasket 30 having peripheral, outer, parallel gasket beads 36 and 38 which fit on either side of the pipe beads 32 and 34 to form a sealing relationship about the exteriorperiphery of each pipe 14 and 16. The gasket is characterized further by an inward central protrusion 54 which extends between the abutting ends 18 and 20 of the pipes 14 and 16 to provide for a sealing means between the ends and to provide a cushion for the ends of the pipe. The elastomeric gasket 30 also includes a raised central gasket area 40 which conforms to a generally sectional, trapezoidal shape of the raised trapezoidal central raised section 46 of the band clamp 12 and fits snugly therein, so that the gasket is prevented from shifting during use. If desired, each of the band straps 22 and 24 may be secured by a rivet or other means to the clamping band in the strap-retaining area into their respective positions. The elastomeric sealing gasket 30 may be secured to the underlying surface of the band clamp, or the band straps and/or gaskets may be used separately and may be assembled and placed in position just prior to use and operation of my clamping assembly.

Figure 3:
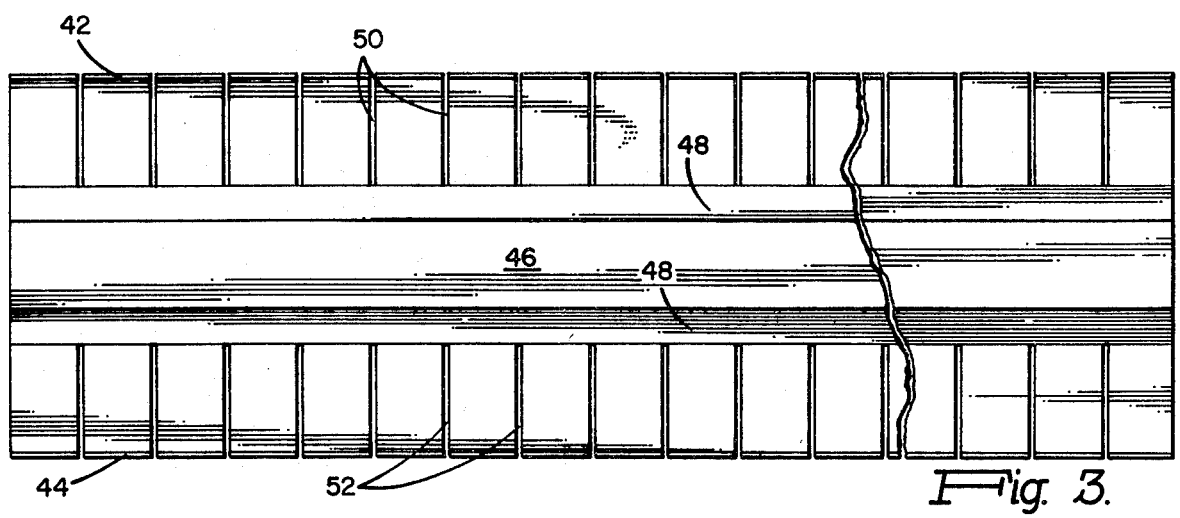
FIG. 3 shows a top plan view of the band clamp in my clamp assembly.

In use, the first 14 and second 16 pipes with first aligned pipe end 18 and pipe end 20 are placed in an aligned position, and the peripheral elastomeric sealing gasket 30, such as a gasket composed of neoprene or other elastomeric resilient-type material, is inserted so that the center ridge 54 is placed between pipe ends 18 and 20, and the parallel gasket beads 36 and 38 are engaged sealingly on either side of the pipe beads 32 and 34. The clamp band 12 is then placed over the elastomeric gasket, with the central raised section 46 of the band 12 over the raised central gasket area 40. This arrangement is most desirable in that it prevents the sealing gasket from moving; although other elastomeric-sealing gaskets, wherein no central gasket area is used, may be employed, such as those prior-art gaskets shown, for example, in FIG. 3 of U.S. Pat. No. 3,233,922, supra. If desired, of course, a gasket may be used without any center edge and without any gasket beads, such as, for example, a flat strip of elastomeric material, or other sealing or gasketing means.

The clamp band 12 is then placed about the elastomeric gasket 30, the clamp bands width extending about the width of the gasket 30, the ends of the clamp band slightly overlapping, with the clamp band having a smooth, noncorrugated surface; for example, made of flexible stainless-steel sheet material. The outer edge beads 42 and 44 may be omitted typically from the very end overlapping portions, so as to permit easy overlapping of the end portions of the clamp band. First and second band straps 22 and 24 are secured either to the band clamp 12 or are placed in the flat retaining areas between the outer edge beads 42 and 44 and the sides 48 of the raised central section, this area typically being of sufficient width to accommodate the straps or number of straps to be used on each side to prevent lateral movement of the straps from the clamp. The raised edges 42 and 44 and sides 48 prevent the clamp from moving axially or laterally or from becoming displaced during use. The parallel slots 50 and 52 in the band 12 on either side permit the snug tightening of the band clamp 12 about the periphery diameter of the pipes, particularly where the pipes may be of a slightly different external diametric tolerance. The band straps are then tightened employing threaded tension bolts 26 and 28 to place the elastomeric gasket in a sealing relationship with the external surface diameter of the pipes and the pipe end; thus, completing the pipe joint.

In the preferred embodiment as shown and described, my clamping assembly provides for the nonslip placement of the compressible band straps about the periphery of the pipes. My pipe-coupling and pipe-clamping assembly, therefore, provides for the prepositioning of disposed band straps, a band clamp adjustable to tolerances in pipe diameters, and a sealing gasket which may be fixed in position and for a clamping assembly which may be manufactured economically and overcomes many of the disadvantages of prior-art clamping assemblies.

What I claim is:

1. A clamping assembly such as for joining two pipes in an end-to-end relationship in a clamping position, which assembly comprises:
   (a) a flexible, sheet-metal, clamping band of defined length and adapted to surrounding circumferentially the ends of the pipes to be joined with the opposite ends of the clamping band in an overlapping, slidably adjustable, nesting relationship, the clamping band having
      (i) a raised edge bead along each outer edge of the band and extending generally about the circumference of the clamping band in the clamping position;
      (ii) a preformed, raised, central section extending generally the defined length of the clamping band;
      (iii) band-strap-retaining areas extending on both sides of the raised central section, the raised edge beads on each side and the sides of the raised central section forming two generally parallel band-strap-retaining areas of sufficient width to accommodate a flat band-strap therein, and (iv) a plurality of slots extending inwardly from the outer edge of the clamping band and generally longitudinal to the ends to be joined, the slots extending generally throughout the defined length to permit the adjustment of the clamping band in each band-strap-retaining area;

(b) a compressible, circumferential, sealing gasket adapted to be disposed between the pipe ends and the overlapping clamping band and to overlap and bridge the entire junction between the pipe ends, the gasket characterized by an outwardly raised, peripheral, central section, which central section is contoured in form and fits snugly within the raised central section of the band clamp to prevent movement of the sealing gasket in the clamping position; and (c) at least a pair of flat band straps, one strap disposed and positioned in each of the band-retaining areas of the band clamp, the band straps including a band-tensioning means, whereby the band straps may be tightened to compress the underlying sealing gasket into a fluid-tight sealing relationship.

2. The clamping assembly of claim 1 wherein the slots in the band clamp are spaced at intervals of from about ½ to 2 inches in in length along the peripheral length of the band clamp and extend inwardly from about ½ to 2 inches.

3. The clamping assembly of claim 1 wherein the band straps positioned in the strap-retaining area are secured to the clamping band.

4. The clamping assembly of claim 1 wherein the sealing gasket comprises an elastomeric gasket which extends substantially the width of the clamping band and which includes an inwardly extending, generally central, peripheral sealing bead, the sealing bead adapted to be disposed between the abutting edges of the ends of the pipes in the clamping position.

5. The clamping assembly of claim 4 wherein the sealing gasket includes a pair of two generally parallel, inwardly extending beads spaced toward each outer edge of the sealing gasket adapted to engage and fit about parallel beads in the ends of the pipes to be joined to form a sealing relationship.

6. The clamping assembly of claim 1 wherein the raised edge bead comprises a generally continuous raised edge of the band clamp raised at about a 90° angle, and wherein the raised central section of the clamping band joins the intervening flat strap-retaining areas at an angle of about 45°.

7. The clamping assembly of claim 1 wherein the means for tensioning the band straps includes threadable tension means on each band strap.

8. A pipe-coupling comprising:
(a) two, opposing, generally axially aligned pipes, each pipe having a peripheral edge placed in a generally abutting end relationship;
(b) a clamping assembly positioned circumferentially about and bridging the gap between the pipe ends in a clamping position, the clamping assembly comprising
(a) a flexible, sheet-metal, clamping band of defined length surrounding circumferentially the ends of the pipes with the opposite ends of the clamping band in an overlapping, slidably adjustable, nesting relationship, the clamping band having
(i) a raised edge bead along each outer edge of the band and extending generally about the circumference of the clamping band in the clamping position;
(ii) a preformed, raised, central section extending generally the defined length of the clamping band;
(iii) band-strap-retaining areas extending on both sides of the raised central section, the raised edge beads on each side and the sides of the raised central section forming two generally parallel band-strap-retaining areas of sufficient width to accommodate a flat band-strap therein, and
(iv) a plurality of slots extending inwardly from the outer edge of the clamping band and generally longitudinal to the joined ends, the slots extending generally throughout the defined length to permit the adjustment of the clamping band in each band-strap-retaining area;

(b) a compressed, circumferential, sealing gasket disposed between the pipe ends and the overlapping clamping band and overlapping and bridging the entire junction between the pipe ends, the gasket characterized by an outwardly raised, peripheral, central section, which central section is contoured in form and fits snugly within the raised central section of the band clamp to prevent movement of the sealing gasket in the clamping position; and (c) at least a pair of flat band straps, one strap disposed and positioned in each of the band-retaining areas of the band clamp, the band straps including a band-tensioning means, whereby the band straps may be tightened to compress the underlying sealing gasket into a fluid-tight sealing relationship.

* * * * *